April 15, 1924.

F. H. VICK 1,490,352

FRAMING MECHANISM FOR MOTION PICTURE MACHINES

Original Filed June 5, 1920   2 Sheets-Sheet 1

Inventor
Frank N. Vick
By his Attorneys
Pennie, Davis, Marvin & Edmonds

April 15, 1924.
F. H. VICK
FRAMING MECHANISM FOR MOTION PICTURE MACHINES
Original Filed June 5, 1920  2 Sheets-Sheet 2
1,490,352
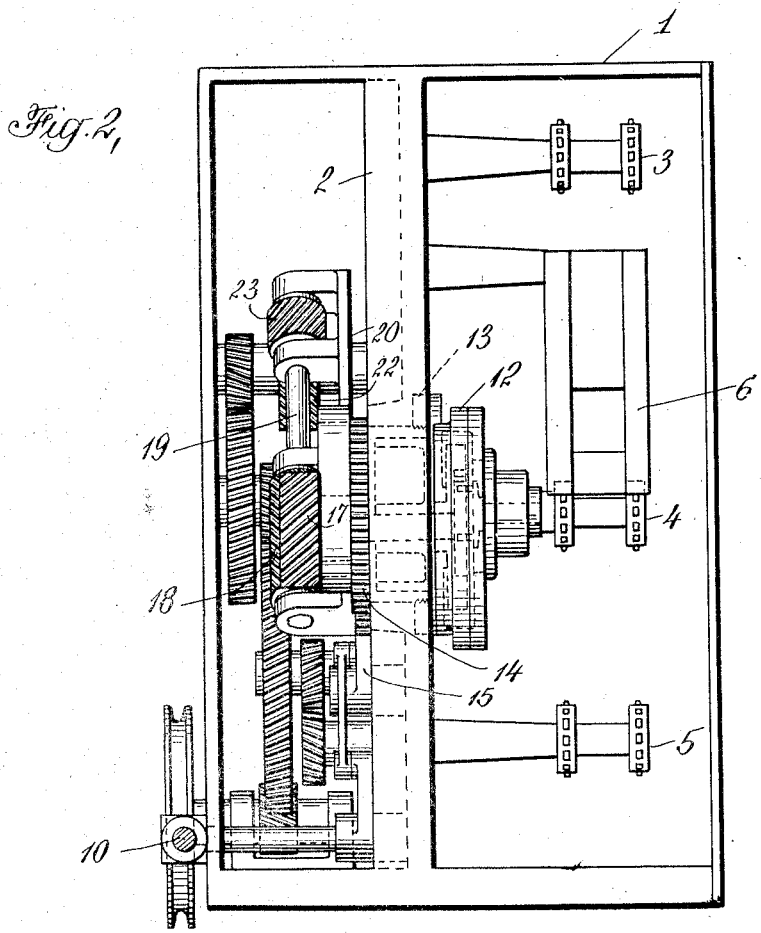
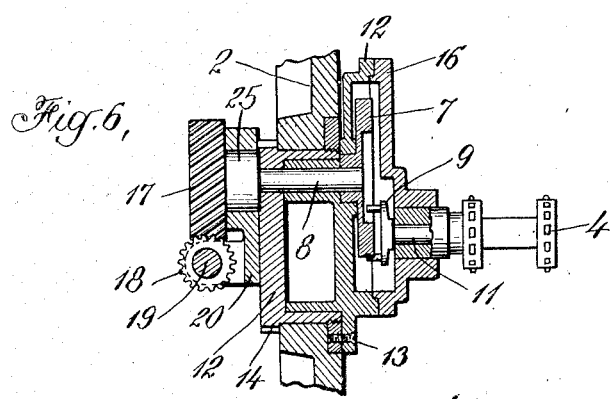
Inventor
Frank H. Vick
By his Attorneys
Pennie, Davis, Marvin & Edmonds Patented Apr. 15, 1924.

1,490,352

UNITED STATES PATENT OFFICE.

FRANK H. VICK, OF NEW YORK, N. Y., ASSIGNOR TO NICHOLAS POWER COMPANY, INC., OF NEW YORK, N. Y., A CORPORATION OF DELAWARE.

FRAMING MECHANISM FOR MOTION-PICTURE MACHINES.

Application filed June 5, 1920, Serial No. 386,909. Renewed June 26, 1923.

*To all whom it may concern:*

Be it known that I, FRANK H. VICK, a citizen of the United States, residing at the city of New York, in the county of New York, State of New York, have invented certain new and useful Improvements in Framing Mechanisms for Motion-Picture Machines; and I do hereby declare the following to be a full, clear, and exact description of the invention, such as will enable others skilled in the art to which it appertains to make and use the same.

This invention relates to framing mechanisms for motion picture machines, and has for its object to provide a framing mechanism in which the framing of the picture is effected by giving to the feeding sprocket an extra movement, either forward or backward, of sufficient extent to correct the displacement of the picture at the aperture.

The principal object of the invention is, to provide a framing mechanism of this character in which the extra movement given to the sprocket does not alter the timed relation between the intermittent movement and the shutter. In framing mechanisms of this kind heretofore constructed, the intermittent gear for the sprocket has been driven through a planetary or epicyclic gear to permit the rotation of the driving member of the intermittent couple around the axis of the sprocket to thereby effect the partial rotation necessary to frame the picture. In such machines, in addition to the slight rotation given the sprocket, a partial rotation is also given to the driving member of the intermittent couple about its own axis, thereby destroying the relation between the sprocket and the shutter. To correct this it has heretofore been necessary to use a shutter adjusting mechanism operating in synchronism with the framing to give a corrective adjustment to the shutter, thereby adding to the complication and cost of the machine.

The object of the invention of the present application is to provide an improvement on the mechanism disclosed in the co-pending application of Theodore F. Uhlemann and William Ellwood, Serial No. 372,763, filed April 10, 1920, for framing mechanism for moving picture machines, to reduce the number of parts and the space occupied by the gear for the intermittent sprocket, whereby the dimensions of the machine may be reduced and the cost of manufacture lowered.

A further object of the invention is to provide a gearing in which there is no partial rotation given to the transmitting gears about their own axes during the framing movement, as distinguished from the mechanism of the above entitled application in which the tendency to individual rotation of the different elements of the transmitting gear are so opposed to each other as to prevent the individual rotation reaching the sprocket. The mechanism of the aforesaid co-pending application is, so far as the effect on the sprocket is concerned, in all respects the same as that produced by the invention of the present application, but the self-compensating gearing therein disclosed, adds to the cost and complication of the machine in a manner avoided by the mechanism of the present case.

In the accompanying drawings I have illustrated my improved framing mechanism applied to a conventional motion picture machine, the parts of the machine, aside from the framing mechanism, being illustrated diagrammatically.

In the drawings,

Fig. 2 is a rear elevation of the machine of Fig. 1;

Figure 3:
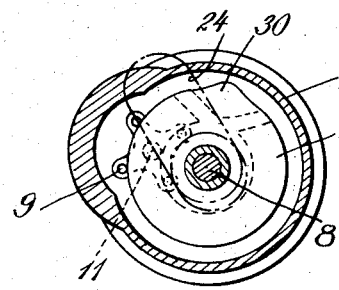
Figure 4:
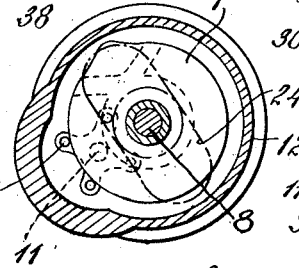
Figure 5:
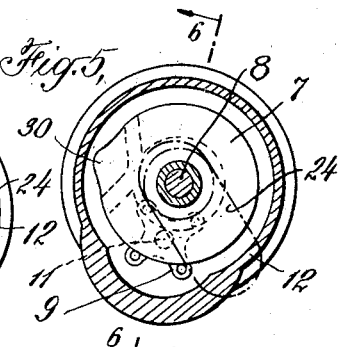

Figs. 3–5, inclusive, are fragmentary views showing the relative positions of the parts in different positions of adjustment, and Fig. 6 is a sectional view on line 6—6 of Fig. 5.

Figure 1:
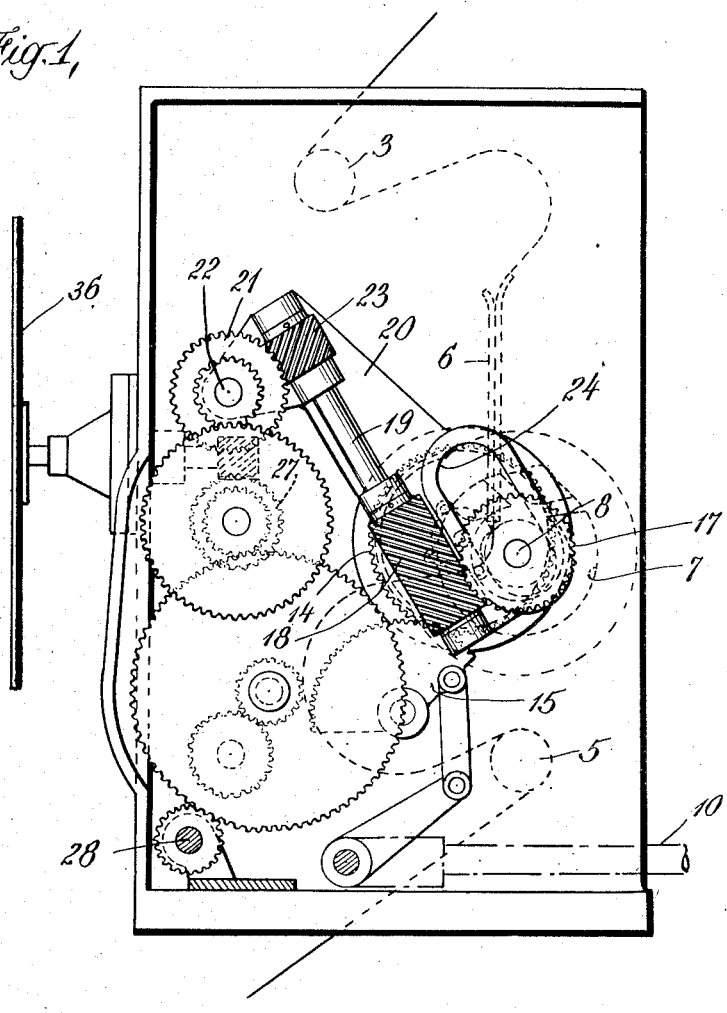
Figure 1 is a side elevation of the machine showing the driving connection between the driven member of the intermittent couple and the stationarily supported driving gear of the machine.

Referring to the drawings, particularly to Figs. 1 and 2, 1 indicates the frame of the machine which comprises a vertical web 2 dividing the frame into two separate compartments, one of which contains the driving mechanism for the film-feeding sprockets 3, 4 and 5, which are mounted on the shafts projecting into the other compartment. The sprocket 3 is continuously driven to draw the film from the reel in the usual manner and to provide a loop of film in advance of the intermittent sprocket 4 supported at the lower end of the guide plate 6 containing the projection aperture. From the intermittent sprocket 4 the film passes in a loop to the lower continuous sprocket 5 and thence into the receiving reel in the usual manner.

It is desirable that the intermittent sprocket be maintained in fixed relation with the guide plate 6, so that the tension on the film and the effect of the pull on the film at the aperture will not be altered by the framing adjustment.

The intermittent sprocket may be driven through any suitable intermittent couple, such as the Geneva gear commonly employed in moving picture machines, or the so-called Power cam gear which has been selected for illustration. This gear comprises a cam 7 supported on the end of a continuously driven shaft 8, the cam cooperating with a 4-pronged pin wheel or "pin cross" 9 rigidly attached or formed on the end of the shaft 11 of the intermittent sprocket. The shafts 8 and 11 are rotatably supported in bearings in a housing 12 mounted for rotary adjustment in the vertical web 2 of the machine frame, the axis of rotation of the housing being coincident with the center of the shaft 11, whereby the rotation of the housing will not alter the position of the intermittent sprocket 4.

The housing 12 is preferably composed of an outer part supported in the wall 2 of the frame and held against withdrawal by a ring 13 threaded on the end of such part and lying in a recess in the face of the plate 2. At the other side of the plate 2 the outer part of the housing is provided with a toothed flange 14 which serves to hold the housing against longitudinal movement and also as a rack through which the framing movement is transmitted from the framing lever 10 through an interposed segment 15. The inner part of the housing telescopes within the outer part and the two parts are held against relative rotation by a key, not shown, which permits the withdrawal of the inner part without disturbing the outer part and insures that the two be reassembled in proper relative position, the parts being held together when assembled by screws passing through the marginal flange of the inner part and into the locking ring of the outer part.

Both of the parts of the housing have bearings for the shaft 8, thereby insuring a proper support for that shaft. The shaft 11 is supported in a cover plate 16 attached to the movable section of the housing in the manner shown, whereby when the two parts of the housing are separated and the inner part withdrawn, the alinement and adjustment of the two parts of the intermittent couple will not be disturbed.

The shaft 8 projects beyond the inner face of the housing and is continuously driven by means of a spiral pinion 17 keyed to the end of the shaft and driven from a long worm gear 18 attached to the shaft 19, which shaft is supported on a shiftable bracket 20. The shaft 19 is driven from a gear 21 attached to a shaft 22 mounted in stationary bearings in the machine frame and continuously driven from the power shaft 28 of the machine through a suitable gear train such as illustrated in Figs. 1 and 2.

The bracket 20 is supported at one end on the bearing of the shaft 22 so that it may be swung around the center of the shaft maintaining the pinion 23 at that end of the shaft 19 in mesh with the driving gear 21. At its other end the bracket 20 is provided with a slot or elongated opening 24 which fits over the projecting portion 25 of the bearing of the shaft 8, as more particularly shown in Fig. 6, whereby the gear 17 will be maintained in mesh with the elongated worm gear 18, but may move longitudinally thereof as the housing 12 is adjusted around the center of the shaft 11.

The machine is supplied with the usual rotary shutter 36 supported on a shutter shaft extending at right angles to the axes of the driving sprockets and preferably driven from a pinion 27 mounted on a shaft of the gear train through which the pinion 21 is driven, whereby the pinion 21 and the shutter shaft will be operated in synchronism. The shutter is provided with the usual opaque sector for covering the aperture while the film is advanced by the intermittent sprocket and it is desirable that the sector be no greater in width than actually necessary to cover the movement of the film. For instance, with the Power cam gear disclosed in which the period of movement of the film is but one-sixth of the period of complete rotation of the driving cam, the opaque blade of the shutter need be but 60 degrees of its total circumference, plus sufficient width for the aperture to be fully covered before the movement commences. This desirable relation of the shutter width to the intermittent movement of the film can, however, be used in practice only when the shutter is synchronized with the intermittent movement at all positions of framing adjustment. If the shutter and gear are not exactly synchronized the shutter blade must be given additional width to take care of the discrepancy, and this additional width detracts just that much from the light obtained in the picture.

In the structure of the present application, the synchronism of the shutter and the intermittent gear is not disturbed by the framing movement. Figs. 3, 4 and 5 show different positions of the parts of the intermittent gear at two extreme positions and one intermediate position of framing adjustment. It will be noted from Figs. 3, 4 and 5 that although the sprocket has been turned on its own axis through slightly more than a quarter revolution, as indicated by the positions of the arms of the pin cross, there has been no change in the position of the actuating cam 30 of the driving member and the axis of the sprocket, that is to say, the time of operation of the intermittent sprocket has not been altered by the extra movement given it through the framing mechanism. This extra movement is given without an advance of the driving cam on its own axis because of the sliding connection of the bracket 20 on the bearing of the shaft 8 with the long worm gear 18 driving the pinion 17. In turning around the axis of the driving sprocket the pinion 17 is rotated with respect to a fixed direction, such, for instance, as the vertical, as will be evident from the changing position of the driving projection 30 of the cam 7 but in this rotation the gear 17 does not react against the teeth of the worm 18 to produce a rotation of the pinion 17 on its own axis, for the reason that the pinion can roll along the teeth of the worm without tending to impart rotation to the worm, as would be the case were the worm keyed to the shaft to slide on the shaft as the pinion moved longitudinally of the shaft in the framing movement.

In the structure disclosed the extent of the angular adjustment of the bracket 20 about the axis of the shaft 22 is so slight as to effect the adjustment of the shutter to an immaterial extent in any event, but this movement may be entirely compensated for by reversing the angle of the teeth of the two gear couples 21, 23 and 17, 18, respectively in the manner shown in the drawings, that is, if the gear 23 moves around the axis of the shaft 22 in the direction of rotation of the pinion 21, there will be an equal movement of the worm 18 about the axis of the pinion 17, which movement is entirely independent of the movement of the slot 24 on the bearing of the shaft 8. This will be obvious from the relative angular positions of the brackets 20 shown in Figs. 3–5 in the different positions of adjustment.

The mechanism shown and described is believed to be the simplest and best form of mechanism for carrying my invention into effect, but it is obvious that the construction may be variously changed without departing from the invention, for instance, the connection of the bracket 20 with the bearing of the shaft 22 might be the movable connection, with the other end of the shaft connected for angular movement alone. Other modifications will doubtless suggest themselves to those skilled in the art, which are within the scope of the appended claims.

I claim:

1. In a framing mechanism for motion picture machines, the combination of a driving shaft having a fixed axis of rotation, an intermittent sprocket, means for driving said sprocket from said driving shaft, said means comprising an intermittent couple having its driving member bodily adjustable with relation to said driving shaft and driving connections between said member and said driving shaft comprising a shaft extending in a plane at an angle to the axis of rotation of said sprocket and adjustable with said driving member to maintain a driving connection with the driving shaft.

2. In a framing mechanism for motion picture machines, the combination of a driving shaft having a fixed axis of rotation, an intermittent sprocket, means for driving said sprocket from said driving shaft, said means comprising an intermittent couple having its driving member bodily adjustable with relation to said driving shaft, and driving connections between said member and said driving shaft comprising a shaft having a driving connection at its opposite ends with said fixed driving shaft and said driving member, respectively, and adjustable in the plane of its axis to maintain such driving connection during the adjustment of the driving member of the intermittent couple.

3. In a framing mechanism for motion picture machines, the combination of a driving shaft having a fixed axis of rotation, an intermittent sprocket, means for driving said sprocket from said driving shaft, said means comprising an intermittent couple having its driving member bodily adjustable with relation to said driving shaft, and driving connections between said member and said driving shaft comprising a shaft for converting rotation of said driving shaft into rotation of said member, said connections having a driving connection at its opposite ends with said fixed driving shaft and said driving member, respectively, and adjustable in the plane of its axis to maintain such driving connection during the adjustment of the driving member of the intermittent couple, and means for preventing rotation of the driving member about its own axis during the period of its bodily adjustment.

4. In a framing mechanism for moving picture machines, the combination of an intermittent sprocket, means for driving the sprocket comprising a shiftable driving member with its axis parallel to the axis of the sprocket, a driving shaft having a fixed axis of rotation and an intermediate shaft having a driving connection with said driving shaft and with said shiftable member and adjustable in the plane of its axis to maintain its driving connection with said adjustable part in different positions of framing adjustment.

5. In a framing mechanism for motion picture machines, the combination of an intermittent sprocket, an adjustable driving member therefor, a fixed main driving shaft, an intermediate shaft extending from said main driving shaft to said adjustable driving member, said shaft being adjustable with said member in the plane of its axis, and driving connections between said intermediate shaft and said other two parts comprising a pair of spiral gears arranged for one gear of the pair to roll on the periphery of the other during the framing adjustment.

6. In a framing mechanism for motion picture machines, the combination of an intermittent sprocket, an intermittent couple for driving said sprocket, the driving member of said couple being mounted for adjustment about the axis of the sprocket to frame the picture, and means for driving said driving member comprising a driven shaft having a long spiral gear, a spiral gear on the driving member of said intermittent couple meshing therewith, said last named gear being mounted to roll on the periphery of said long gear during the framing movement to thereby maintain a driving connection at different positions of adjustment.

7. In a framing mechanism for motion picture machines, the combination of an intermittent sprocket, an intermittent couple for driving said sprocket, the driving member of said couple being mounted for adjustment about the axis of the sprocket to frame the picture, and means for driving said driving member comprising a driven shaft mounted for oscillation and having a long spiral gear, a spiral gear on the driving member of said intermittent couple meshing therewith, said last named gear being mounted to roll on the periphery of said long gear during the framing movement to thereby maintain a driving connection at different positions of adjustment.

8. In a motion picture machine, a framing mechanism comprising an intermittent sprocket supported with its axis of rotation fixed with relation to the projection aperture, an intermittent couple driving said sprocket, means for adjusting the driving member of said couple around the axis of said sprocket to thereby give a partial rotation to the sprocket for framing the picture, and means for driving the driving member of said couple from a driving shaft having a fixed axis of rotation, comprising a shaft lying in a plane at an angle to the axis of the intermittent sprocket and adjustable with the adjustment of the driving member of said couple.

9. In a framing mechanism for moving picture machines, the combination of an intermittent sprocket, an intermittent couple for driving the sprocket, means for adjusting the driving member of said couple to frame the picture and means for actuating said driving member comprising a main driving shaft having a fixed axis of rotation, a bracket mounted for oscillation thereon, and having an elongated bearing carried by the axis of the driving member of said couple and an intermediate shaft carried by said bracket and having a geared connection with said main driving shaft and the driving member of said couple, the last named connection comprising a long spiral gear on said shaft into which the companion gear on the driving member of said couple rolls during the framing adjustment.

In testimony whereof I affix my signature.

FRANK H. VICK.